ERROR DETECTION SYSTEMS
Filed June 11, 1959
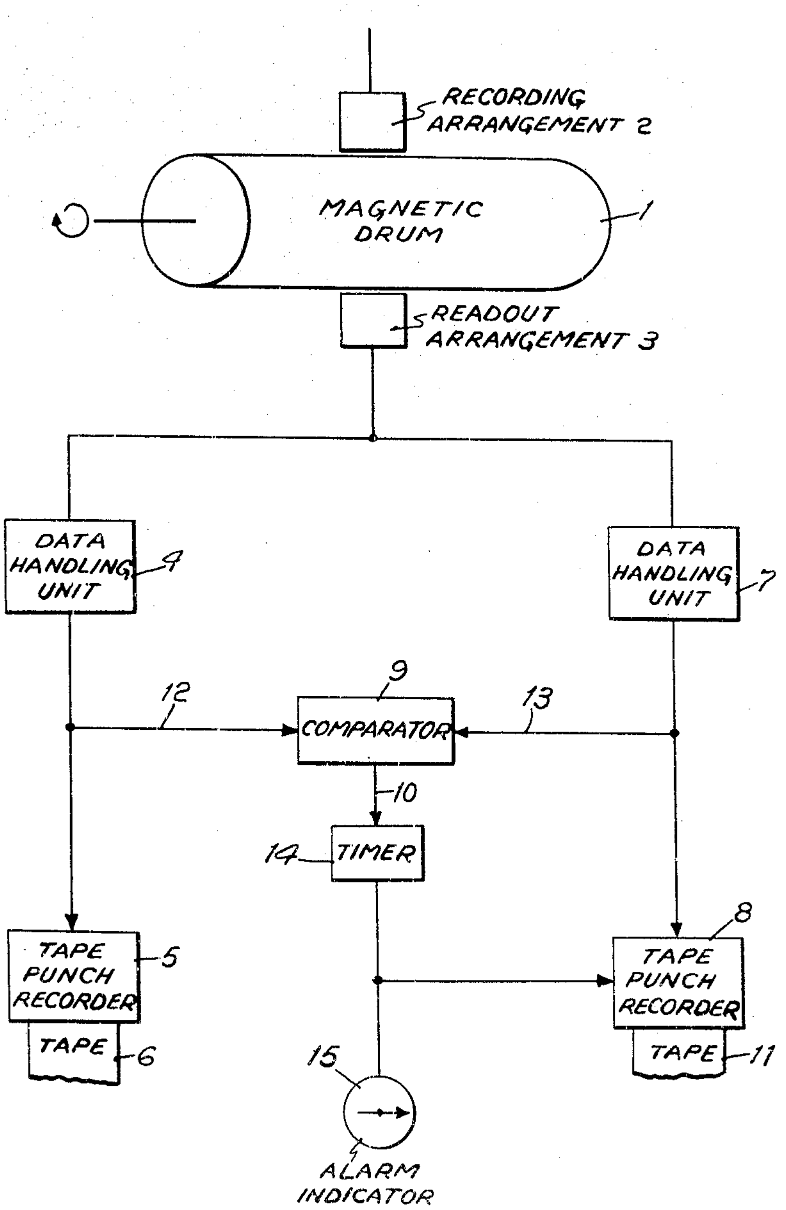
INVENTORS.
RAYMOND C. P. HINTON
ROBERT B. PAGE
JOHN P. LARKIN
BY Philip M. Bolton
ATTORNEY United States Patent Office 2,950,464

Patented Aug. 23, 1960

2,950,464

ERROR DETECTION SYSTEMS

Raymond C. P. Hinton, Teaneck, N.J., Robert B. Page, Staten Island, N.Y., and John P. Larkin, Passaic, N.J., assignors to International Telephone and Telegraph Corporation, Nutley, N.J., a corporation of Maryland Filed June 11, 1959, Ser. No. 819,729

4 Claims. (Cl. 340—174)

The present invention relates to error detection systems and more particularly the invention relates to error detection systems insuring continuous operation when errors are detected in data handling systems.

In data handling systems, data is processed at high speed in a sequence of operations which usually includes complex circuitry and transfer of data from one unit to another. For various well known reasons, failures may occur occasionally in the circuit components and as a result the performance of the apparatus may be deleteriously affected. By way of example, in data handling systems utilizing binary code representations on numbers, letters, machine instructors or other information, a simple pulse missing from a code representation may introduce serious errors in the information read out of the system. It is important that such failures be detected and brought to the attention of the operator of such systems so that corrective action may be taken.

Various methods for detection of errors have already been used. One such method depends on transmitting information or signals in such a manner that at least two simultaneous trouble conditions are necessary to cause a false circuit action. A single trouble condition will cause the signals to be incomplete, and the circuits will recognize this as a trouble condition. With reliable apparatus and circuits, the probability of two simultaneous trouble conditions is so small that additional checking facilities are usually unnecessary. This technique may be applied to various types of data processing devices and circuitry where identical circuits may be coupled in a parallel manner and provided with means to compare or verify that the proper signals are received over each separate circuit.

Various forms and means for comparing the readouts of data units have already been devised to determine agreement or disagreement of data representation. Such comparing devices not only enable the detection of errors, which without such disagreement may affect recorded data, but also are utilized to determine whether certain operating sequences should be carried out, the performance of which is dependent upon the equality or inequality of data in the readout from data units.

When an error is detected, the normal sequence of operation is normally interrupted to diagnose or record the error condition. One such redundant system wherein automatic error detection and switching is used is the calculating system described in U.S. Patent No. 2,588,923, issued March 11, 1952, to W. Hatton. However, interruption of the normal sequence of operation is objectionable in certain data handling devices requiring continuous operation such as automatic message recording devices in telephone systems where the recorded call data usually include calling and called subscribers' numbers, answering time, disconnect time and the date.

It is an object of the present invention to provide an improved error recording system for uninterrupted operation of redundant data systems.

Another object of the present invention consists of providing separate readout records during error conditions, for each unit of a redundant system and only a single readout during normal conditions.

A further object is to provide during error conditions, simultaneous and separate readout records for each unit of a redundant data system.

A still further object is to provide an error recording system in redundant data systems that is simpler and has fewer components than previous arrangements accomplishing this function.

Other features and objects of the present invention will appear from reading the present description of an embodiment illustrated in the single figure of the annexed drawing.

Referring to the single figure of the drawing which shows a schematic block diagram illustrating an error detecting system used for automatic message recording in telephone systems to record such call data as is required for billing purposes. This type of system is fully disclosed in the following U.S. applications: R. C. P. Hinton, Serial No. 616,081, filed October 15, 1956, for "Magnetic Toll Dialing Recording System"; R. C. P. Hinton, B. Dzula, A. Fettweis, Serial No. 594,187, filed June 27, 1956, for "Tape to Card Converter," now Patent No. 2,945,221 granted July 12, 1960; R. C. P. Hinton, B. Dzula, A. Fettweis, Serial No. 598,961, filed July 19, 1956, for "Recording System"; and R. C. P. Hinton, B. Dzula, Serial No. 594,756, filed June 29, 1956, for "Calling Station Identification," now U.S. Patent No. 2,894,069, granted July 7, 1959.

Some parts of this system of interest to the present invention are shown in Fig. 1, and the method of operation is briefly as follows: call data including calling and called subscribers' numbers, answering time, disconnect time, and date are accumulated and are temporarily stored on a magnetic drum 1 in binary-decimal characters by a suitable recording arrangement 2. When this magnetic drum record is complete, the stored data is extracted by a readout circuit arrangement 3 and transmitted through a data handling unit 4 to a tape punch recorder 5, where a permanent record is made on tape 6. The tape punch recorder 5 may be any suitable conventional type, such as, for example, is described in the booklet, "High Speed Tape Punch and Tape Reader," by Teletype Corporation, copyrighted 1954. The tape record 6 is collected at certain times for example, monthly, and sent to a processing center. The records are then transferred to punch cards and processed by conventional accounting machines. In this manner a detailed account is made of each call for billing purposes.

While for purposes of illustration, the recording arrangement 2 and the readout arrangement 3 have been shown as simple boxes, they may consist of complex circuits involving a plurality of recording heads and a plurality of readout heads together with appropriate switching and control systems. Since the details of these arrangements are not germane to the present invention, they will be omitted, reference being had to the above-mentioned applications for these further details. Likewise, an understanding of the details of the data handling unit 4 are not necessary for an understanding of the present invention. Said data handling unit 4 may, for example, be similar to that shown in U.S. Patent No. 2,798,554, granted July 9, 1957, to C. B. Smith for "Data Transfer Apparatus," and may include a conventional matrix to convert from the binary-decimal system to the conventional tape punch recorder code for subsequent use on punch cards. Other control circuits, such as synchronization, and selection circuits may be combined therein. Such data handling units are relatively complex and the possibility of trouble developing in such a unit is always present. When any of the circuits of such a unit or its components become inoperative, call data may not be produced or may become unusable, thereby causing a loss to the operating agency which may become important, particularly in cases where the telephone offices are unattended.

The present invention improves the reliability of the system shown in the figure by duplicating certain of the above-mentioned devices. More specifically, a duplicate data handling unit 7 is also coupled to the readout arrangement and feeds a duplicate punch recorder 8. Thus, duplicate elements 4 and 7, and 5 and 8 are arranged in parallel. The probability of simultaneous failure in the duplicate data handling units is remote and in case one of these units fails, the system will remain operative. The tape punch recorder 5 is normally in operation, while the tape punch recorder 8 is normally *not* in operation until a discrepancy is detected at the outputs of the data handling units 4 and 7 whereupon the tape punch recorder 8 is thrown into operation for a predetermined period. For this purpose, the outputs of data handling units 4 and 7 are compared in a comparator unit 9. Comparator 9 is arranged to read the outputs of data units 4 and 7 and to determine agreement or disagreement thereof and to provide an output control signal via line 10 to start the tape punch recorder 8 when the outputs of units 4 and 7 do not correspond. The comparator unit 9 may be of the type disclosed in U.S. Patent No. 2,752,489, issued June 26, 1956, to P. R. R. Aigrain. It compares the data from the data handling units bit by bit. Where each of the data units 4 and 7 supplies a number of bits simultaneously (in parallel), each bit from one unit is preferably compared separately with what should be the corresponding bit of the other unit, and for this purpose the comparator may consist of one or more of the types of comparator units hereinbefore described. Other comparison means are well known in the art and, therefore, need not be here detailed.

In order that the information punched on the tape 11 operated by punch tape recorder 8 should be capable of being correlated with the data on tape 6 for comparison therewith, the system is arranged so that each time a fault or difference is noted by comparator 9, this trips a timer 14 which, in turn, turns on tape punch recorder 8 for a predetermined time. The timer 14 may be a slow-acting relay which upon actuation closes a circuit for a predetermined period before it releases, a counter device which counts clock or other suitable pulses which are available either from the data handling unit or from some independent unit, or a timing R-C circuit, or any other suitable electrical or mechanical timer. If the data consists of the material described before, such as calling and called subscribers' numbers, answering time, etc., the timer is preferably arranged so that for each fault detected by the comparator, the timer will operate to close a circuit actuating the tape punch recorder 8 for a period equal to a complete message unit consisting of all the data pertained to a single call. Likewise, a suitable alarm indicator 15 may be coupled to the output of the timer 14 and ring an alarm if this is desired or turn on an alarm signal to call the attention of attendants to the difficulty.

The operation of the system will now be described.

When the required call data relating to a call has been accumulated on the magnetic drum 1, the readout circuit arrangement 3 is made operative by means not shown. The data is now transmitted simultaneously to data handling units, units 4 and 7. The data is processed and converted in units 4 and 7 to a form suitable to conventional tape punch recorders. The output from the data unit 4 is applied to tape punch recorder 5 where a record is made in a conventional manner and independent of whether or not the output is correct or in error. The output of each of the data units 4 and 7 is also applied to comparator 9 via connections 12 and 13, respectively, for comparing the readouts. In case of agreement of the readouts, no further action takes place thereby indicating that the record on tape 6 is correct. In case there is disagreement of readouts, comparator 9 activates tape punch recorder 8 via connection 10 and timer 14, causing a second record to be made of the output from unit 7 on tape 11 thereby indicating an error. By visually comparing tapes 6 and 11 with each other, it is often possible to determine the cause of the error, thereby facilitating the location of a faulty component.

In the present application of message recording for telephone systems, it is often possible to deduce the correct data by fixed or unused number combinations as, for example, the tapes produced in one office should have the same prefix for all calls. A wrong prefix on one of the records indicates the faulty data unit and possibly the faulty component. Similar conditions exist for data relating to the terminating area or office where unused number combinations serve the same purpose as a prefix in the originating office. An error relating to the time of the call may easily be determined by comparing the records for calls preceding and succeeding an error. Further, certain digits are of little or no importance in determining the cost of a call such as the last digits of a called subscriber's number. In this case, the billing of the call can be made and a broad idea is had of the cause of the trouble. In case of a permanent fault in one of the data units 4 or 7, the location of the fault may often be facilitated by comparing tapes 6 and 11. Further, the fault alone or in combination with the recorded data may provide sufficient information for correcting the billing record. An intermittent fault may be deducted in a similar manner simply by examining tapes 6 and 11. To facilitate location of these faults, of for example, one digit, the tape punch recorder 8 is maintained operative for one or more succeeding calls. Finally, if one or the other of the data units 4 or 7 becomes inoperative, the second unit will supply the required record. In this manner the call data, including errors, are accumulated during a predetermined time without any interruption to the recording function. This feature is particularly useful in telephone offices where the service is unattended. Further this method of operation permits the data to be recorded as soon as processed by units 4 and 7 and as a consequence simple circuits may be used and intermediate storage devices are not required.

While we have described above the principles of our invention in connection with specific apparatus, it is to be clearly understood that this description is made only by way of example and not as a limitation to the scope of our invention as set forth in the objects thereof and in the accompanying claims.

We claim:

1. In a data handling system, means for storing data, means for extracting data from said storing means, a first printing recorder arranged to continuously print information fed thereto, a second printing recorder normally inoperative to print the information fed thereto, a first data handling unit for processing the data extracted from said storing means and feeding it to said first printing recorder, a second data handling unit for processing the data extracted from said storing means and feeding it to said second printing recorder, means for comparing the data processed by said first and second data handling units and for producing a control signal when there is a disagreement and means responsive to the control signal for rendering operative said second printing recorder.

2. A data handling system according to claim 1 wherein said means responsive to the control signal includes timing means coupled between said comparing means and said second printing recorder and responsive to said control signal for rendering said second printing recorder operative for a predetermined time.

3. In a data handling system, means for storing data, means for extracting data from said storing means, a first printing recorder arranged to continuously print information fed thereto, a second printing recorder normally inoperative to print the information fed thereto, a first data handling unit for processing the data extracted from said storing means and feeding it to said first printing recorder, a second data handling unit for processing the data extracted from said storing means and feeding it to said second printing recorder, means for comparing the data processed by said first and second data handling units and for producing a control signal when there is a disagreement and means responsive to the control signal for rendering operative said second printing recorder for a predetermined time and, in the absence of further control signals, restoring it to its inoperative state at the end of said predetermined time.

4. In a data handling system, means for storing data, a first means for extracting and processing data from said storing means, a second means for extracting and processing data from said storing means, means coupled to the output of said first and second extracting means for comparing the data provided thereto, a first printing recorder coupled to said first extracting means arranged to print the information extracted, a second printing recorder coupled to said second extracting means and normally inoperative to print the information extracted and means coupling said comparator to said second recorder to render it operative upon disagreement between the data being compared.

References Cited in the file of this patent

UNITED STATES PATENTS

| | | |
|---|---|---|
| 2,702,380 | Brustman | Feb. 15, 1955 |
| 2,910,235 | Southard | Oct. 27, 1959 |